United States Patent
Liu et al.

(10) Patent No.: US 9,582,368 B2
(45) Date of Patent: Feb. 28, 2017

(54) METHOD AND APPARATUS FOR TEXT INPUT PROTECTION

(71) Applicant: TENCENT TECHNOLOGY (SHENZHEN) COMPANY LIMITED, Shenzhen (CN)

(72) Inventors: Yulei Liu, Shenzhen (CN); Bo Hu, Shenzhen (CN); Zhipei Wang, Shenzhen (CN); Ruiyi Zhou, Shenzhen (CN); Xi Wang, Shenzhen (CN); Kai Zhang, Shenzhen (CN); Xin Qing, Shenzhen (CN); Huijiao Yang, Shenzhen (CN); Ying Huang, Shenzhen (CN); Wei Li, Shenzhen (CN); Cheng Feng, Shenzhen (CN); Sha Mo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 349 days.

(21) Appl. No.: 14/201,869

(22) Filed: Mar. 9, 2014

(65) Prior Publication Data

US 2014/0298158 A1    Oct. 2, 2014

Related U.S. Application Data

(63) Continuation of application No. PCT/CN2013/087864, filed on Nov. 26, 2013.

(30) Foreign Application Priority Data

Mar. 26, 2013    (CN) .......................... 2013 1 0098692

(51) Int. Cl.
G06F 11/14    (2006.01)
H04L 29/14    (2006.01)

(52) U.S. Cl.
CPC ...... *G06F 11/1441* (2013.01); *G06F 11/1451* (2013.01); *H04L 29/14* (2013.01)

(58) Field of Classification Search
CPC ............. G06F 17/243; G06F 2221/031; G06F 2221/0782

(Continued)

(56) References Cited

U.S. PATENT DOCUMENTS 6,701,454 B1 *    3/2004    Fischer ............... G06F 11/1415
                                                      714/15
7,426,654 B2    9/2008    Adams, Jr. et al.

(Continued)

FOREIGN PATENT DOCUMENTS

CN    102117333 A    7/2011
CN    102779177 A    11/2012

OTHER PUBLICATIONS

The World Intellectual Property Organization (WIPO) International Search Report for PCT/CN2013/087864 Feb. 20, 2014.

*Primary Examiner* — Stephen Hong
*Assistant Examiner* — Sanchita Roy
(74) *Attorney, Agent, or Firm* — Anova Law Group, PLLC

(57) ABSTRACT

Methods and apparatus for text input protection are provided. Text content inputted in an input field can be saved, after the text content inputted by a user in the input field of a browser on a mobile terminal is detected. When the browser is abnormally terminated while the user inputting the text content, the browser can be restarted and the saved text content can be imported into the input field. An exemplary apparatus can include a storage unit, an importing unit, and/or a cleanup unit.

18 Claims, 4 Drawing Sheets

(58) Field of Classification Search
USPC .................................... 715/221–223; 714/15
See application file for complete search history.

(56) References Cited

U.S. PATENT DOCUMENTS

| | | | |
|---|---|---|---|
| 7,882,072 B1* | 2/2011 | Axe .................. | G06F 17/243 |
| | | | 707/640 |
| 2006/0224674 A1* | 10/2006 | Buchheit ............ | G06F 11/1446 |
| | | | 709/206 |
| 2009/0300505 A1* | 12/2009 | Kita .................. | G06F 17/243 |
| | | | 715/736 |
| 2013/0111338 A1* | 5/2013 | Huo .................. | G06F 17/212 |
| | | | 715/256 |

\* cited by examiner

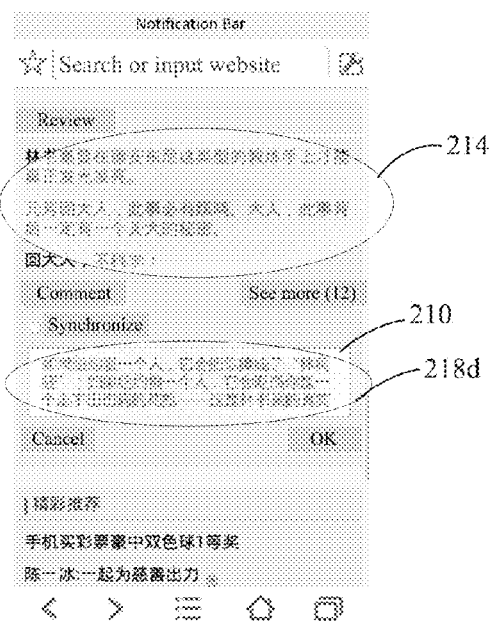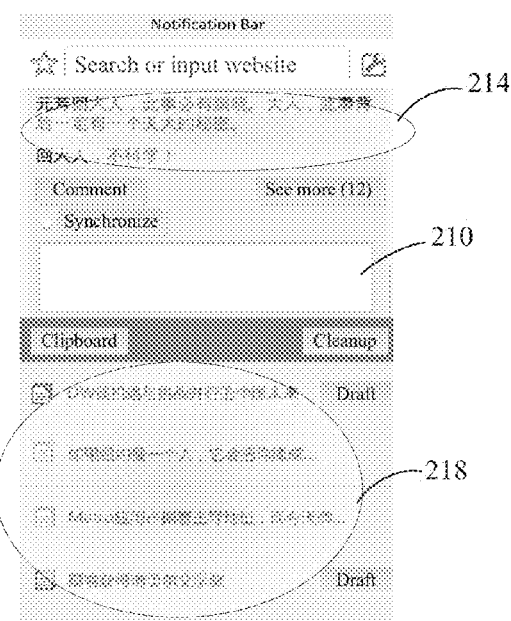
FIG. 2e  FIG. 2f
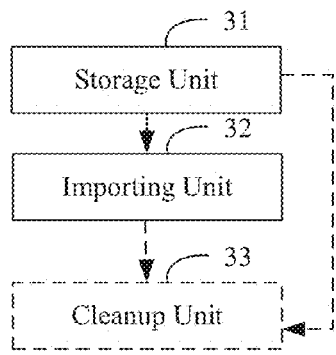
FIG. 3

METHOD AND APPARATUS FOR TEXT INPUT PROTECTION

CROSS-REFERENCES TO RELATED APPLICATIONS

This application is a continuation application of PCT patent application No. PCT/CN2013/087864, filed on Nov. 26, 2013, which claims priority to Chinese Patent Application No. CN201310098692.3, filed on Mar. 26, 2013, the entire contents of all of which are incorporated herein by reference.

FIELD OF THE DISCLOSURE

The present disclosure relates to the field of mobile terminal technology and, more particularly, relates to methods and apparatus for text input protection on a mobile terminal.

BACKGROUND

When a user uses a browser to browse web pages on a mobile terminal, the browser may be suddenly and abnormally terminated after a large amount of text have been inputted on a webpage input field. All text previously inputted may then be lost. After the browser is restarted, the same text has to be inputted again to continue. Such operation is tedious and low efficient and may lead to poor user experience. Therefore, there is a need to provide methods and apparatus for text input protection on a mobile terminal.

BRIEF SUMMARY OF THE DISCLOSURE

One aspect of the present disclosure includes a method for text input protection. After text content inputted by a user in an input field of a browser on a mobile terminal is detected, the text content inputted in the input field can be saved. When the browser is abnormally terminated while the user inputting the text content, the saved text content can be imported into the text input field after the browser is restarted.

Another aspect of the present disclosure includes an apparatus for text input protection. The apparatus can include a storage unit and an importing unit. The storage unit can be configured, after text content inputted by a user in an input field of a browser is detected on a mobile terminal, to save the text content inputted in the input field. The importing unit can be configured, when the browser is abnormally terminated while the user inputting the text content, to import the saved text content into the text input field after the browser is restarted.

Another aspect of the present disclosure includes a non-transitory computer-readable medium having computer program. When being executed by a processor, the computer program performs a method for text input protection. The method comprises saving text content inputted in an input field, after the text content inputted by a user in the input field of a browser on a mobile terminal is detected and, when the browser is abnormally terminated while the user inputting the text content, importing the saved text content into the input field after the browser is restarted.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIGS. 2a, 2b, 2c, 2d, 2e, and 2f are schematics showing examples for text input protection in accordance with various embodiments;

FIG. 3 depicts an exemplary apparatus for text input protection in accordance with various embodiments;

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
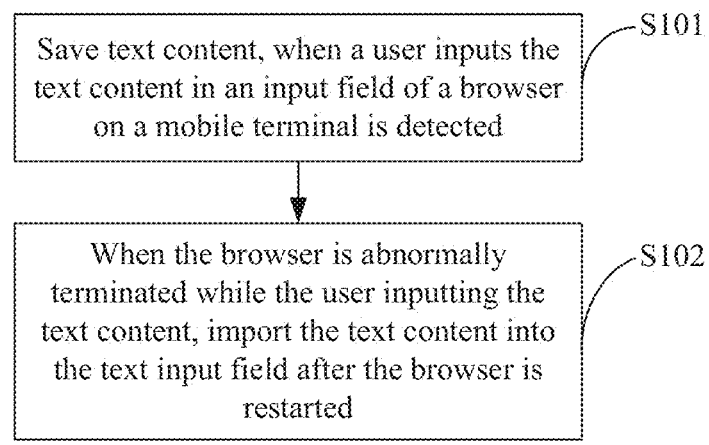
FIG. 1 depicts an exemplary method for text input protection in accordance with various embodiments.

FIGS. 1-3 depict exemplary methods and apparatus for text input protection on a mobile terminal in accordance with various disclosed embodiments. The exemplary methods and apparatus can be implemented in an exemplary environment as shown in FIG. 4 and by appropriate computing platform as shown in FIG. 5.

Figure 4:
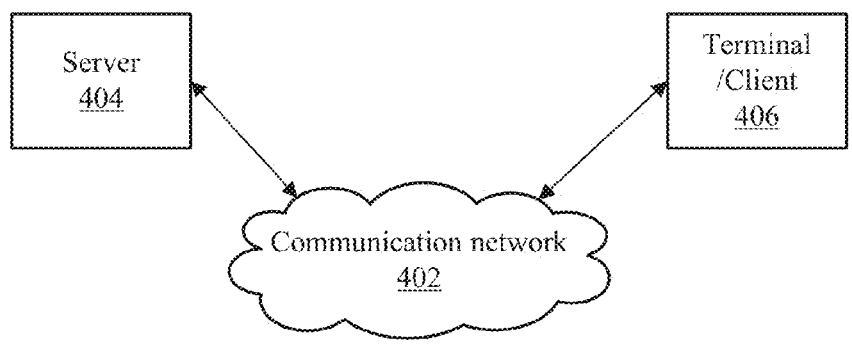
FIG. 4 depicts an exemplary environment incorporating certain disclosed embodiments.
Figure 5:
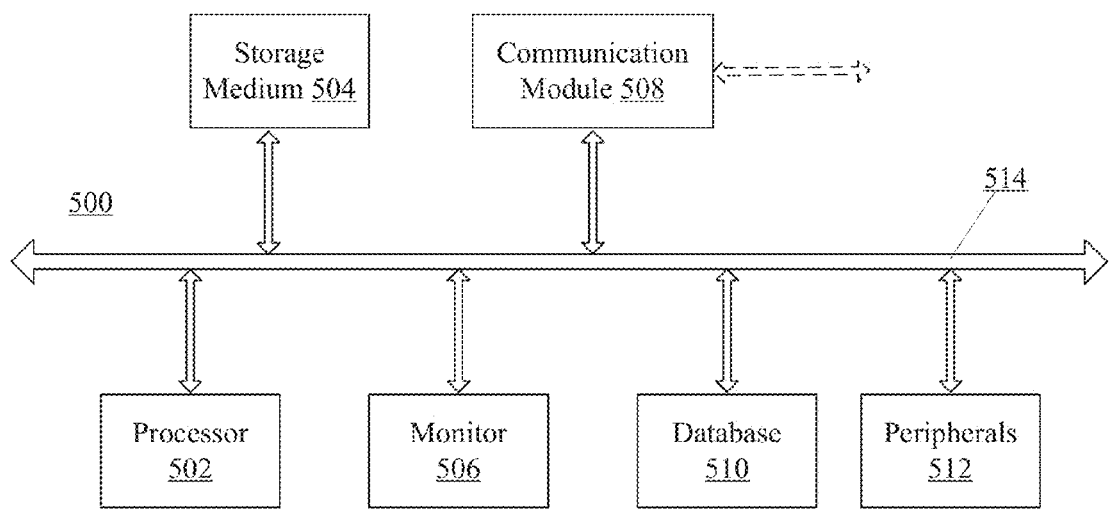
FIG. 5 depicts an exemplary computing system consistent with the disclosed embodiments.

FIG. 4 depicts an exemplary environment 400 incorporating exemplary information obtaining methods and apparatus in accordance with various disclosed embodiments. As shown in FIG. 4, the environment 400 can include a server 404, a terminal 406, and a communication network 402. The server 404 and the terminal 406 may be coupled through the communication network 402 for information exchange, such as data processing, database searching, etc. Although only one terminal 406 and one server 504 are shown in the environment 400, any number of terminals 406 or servers 404 may be included, and other devices may also be included.

The communication network 402 may include any appropriate type of communication network for providing network connections to the server 404 and terminal 406 or among multiple servers 404 or terminals 406. For example, the communication network 402 may include the Internet or other types of computer networks or telecommunication networks, either wired or wireless.

A terminal, as used herein, may refer to any appropriate user terminal device with certain computing capabilities including, e.g., a personal computer (PC), a work station computer, a hand-held computing device (e.g., a tablet), a mobile terminal (e.g., a mobile phone or a smart phone), or any other user-side computing device. A server, as used herein, may refer to one or more server computers configured to provide certain server functionalities, such as database management. A server may also include one or more processors to execute computer programs in parallel.

The server 404 and the terminal 406 may be implemented on any appropriate computing platform. FIG. 5 shows a block diagram of an exemplary computing system 500 capable of implementing the server 404 and/or the terminal 406. As shown in FIG. 5, the exemplary computer system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, such as ROM (Read-Only Memory), RAM (Random Access Memory) and flash memory modules, and mass storages, such as CD-ROM, U-disk, removable hard disk, etc. The storage medium 504 may store computer programs for implementing various processes (such as image processing, image transformation, etc.), when executed by the processor 502.

The monitor 506 may include display devices for displaying information outputted by the computing system 500. Further, the peripherals 512 may include I/O devices such as keyboard and mouse. The communication module 508 may include network devices for establishing connections through the communication network 402. The database 510 may include one or more databases for storing certain data and for performing certain operations on the stored data. In some embodiments, the database 510 can be within the terminal 406. In other embodiments, the database 510 can be within the server 404 and connected with the terminal 406 through the communication network 402, and the terminal 406 can obtain information outputted by the operations (such as database operations) on the server 404.

In operation, the terminal 406 may cause the server 404 to perform certain actions, such as database search or other database operations. The server 404 may be configured to provide structures and functions for such actions and operations.

In various embodiments, a terminal such as a mobile terminal involved in the disclosed methods and systems can include the terminal 406, while a server involved in the disclosed methods and systems can include the server 404. In some embodiments, the disclosed methods and apparatus can be executed by a mobile terminal. The disclosed apparatus can include the computer system as shown in FIG. 5. In some cases, the disclosed apparatus can be configured within or related to a mobile terminal.

FIG. 1 depicts an exemplary method for text input protection in accordance with various disclosed embodiments. In Step S101, text content is saved, when a user inputs the text content in an input field of a browser on a mobile terminal is detected.

In one embodiment, when the mobile terminal browser detects that the user inputs the text content in the input field of the browser, the text content can be automatically saved, e.g., at the backend. The input field can include an own input field (e.g., an address bar and a search bar) of the browser, and a web page input fields. In one example, a web page input field including, for example, an input field on a web page, such as a micro blogger web page, a QQ space web page, and/or other suitable web page, used for publishing micro bloggers and/or for tweeting, can be included.

Optionally, in order to avoid wasting storage space and affecting system performance caused by frequently saving the text content and to satisfy practical requirements from different users, a text input protection function can be started, after receiving an instruction from the user to enable the text input protection function, or after receiving a triggering notification to enable text input protection function generated according to a pre-set time interval. After the text input protection function is started, the user inputted text content can be automatically saved when the mobile terminal browser detects that the user inputs the text content in the input field of the browser.

In Step S102, when the browser is abnormally terminated while the user inputting the text content, the saved text content is imported into the text input field after the browser is restarted.

Note that the abnormal termination of the browser is referred to a termination of the browser under abnormal situations, e.g., that is not terminated by the user. For example, the abnormal termination of the browser may be due to missing and/or corruption of browser software and/or browser plug-ins.

In one embodiment, when the input fields are web page input fields, the step of "importing the saved text content into the text input field after the browser is restarted" can be performed by restarting the browser and browsing to the web page right before the browser is abnormally terminated, and then importing the saved text content into input fields. In practical application, a web page restoring notification can be popped up. When a restoring confirmation is received from the user, the browser can load the web page that is displayed right before the browser is abnormally terminated, and can import the saved text content into the web page's input field.

In one embodiment, in order to distinguish application scenarios of the user and to avoid frequent disturbing to the user, the exemplary method also includes: setting up a text content length threshold (for example, about 20 words or any other suitable number of words). When the browser is abnormally terminated while the user inputting the text content and the inputted text content length exceeds the text content length threshold, the saved text content can be imported into the input field after the browser is restarted. When the browser is abnormally terminated while the user inputting text and the inputted text content length is less than the text content length threshold, the user is notified to re-input the text and cleanup the saved text content after the browser is restarted.

In one embodiment, the Step "importing the saved text content into the input field after the browser is restarted" can include: after the browser is restarted, popping up a prompt box to notify the user about the saved text content. After a restoring instruction is received from the user, the saved text content can be imported into the input field.

Further, when the browser is abnormally terminated for multiple times while the user inputting the text content, the step of "after the browser is restarted, importing the saved text content into the input field" also includes the following.

After the browser is restarted, the user can be prompted with the saved text content, e.g., by popping up a prompt box, and all or a number of the saved text content can be displayed in a listing. After receiving a text content selection instruction sent from the user according to the displayed listing, text content from the multiple saved text content in the listing can be selected. The selected text content can be imported into the input field. For example, the text content displayed in the listing can be sorted by a timestamp for saving the text content. For the convenience of the user to find the most recently saved text content, the most recently saved text content can be displayed at the beginning of the listing.

Optionally, to avoid wasting storage space, the exemplary methods can include cleaning up or deleting the saved text content after an instruction for refusing to restore is received from the user.

Further, to save more storage space, the exemplary method also includes cleaning up the saved text content when it is detected that the inputted text content is normally submitted. For example, when it is detected that the text content of, e.g., a micro blogger and/or tweeting inputted by a user in an input field on a web page (such as a micro blogger web page, a QQ space web page, and/or other suitable web page) is successfully published, corresponding text content saved at the backend can be cleaned up.

The exemplary methods can automatically save text content when the user inputs the text content in an input field of a browser on a mobile terminal is detected. When the browser is abnormally terminated while the user inputting the text content, the browser is restarted and the saved text content is imported into the text input field.

This can thus solve problem that the inputted text may be lost due to abnormal termination of the browser. Repeated operations can be reduced and efficiency can be improved. In addition, application scenarios can be distinguished for the user. In order to avoid frequent disturbing to the user, when the browser is abnormally terminated while the user inputting the text content, a length of the inputted text content can be analyzed. When the length of the inputted text content exceeds the text content length threshold, the browser can be restarted and the saved text content can be imported into the input field.

Further, when the browser is abnormally terminated for multiple times while the user inputting the text content, all of the saved text content can be displayed in a listing, which is convenient for the user to select the text content needed to be imported into the input field.

Furthermore, to save the storage space, the exemplary methods can clean up the text content saved at the backend, after an instruction for refusing to restore is received or after it is detected the inputted text content is submitted normally.

FIGS. 2a, 2b, 2c, 2d, 2e, and 2f are schematics showing examples for text input protection in accordance with various embodiments.

Figure 2A:
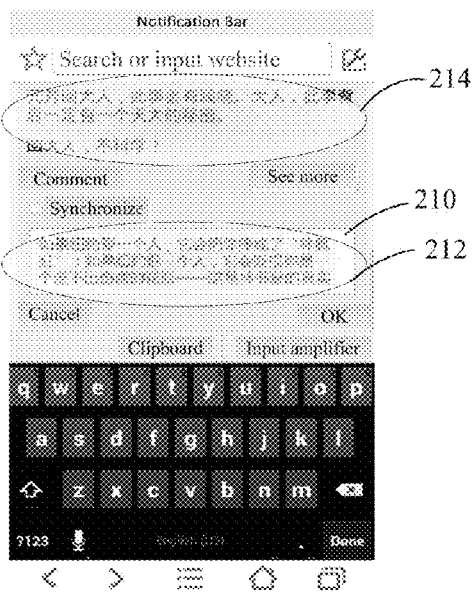

In FIG. 2a, when a browser detects that a user inputs text content 212 on an input field 210 of a current web page 200a, the inputted text content 212 can be automatically saved at the backend. The web page may display other information 214. The browser can be closed or terminated, when an abnormal situation occurs to the browser while the user inputting the text content.

Figure 2B:
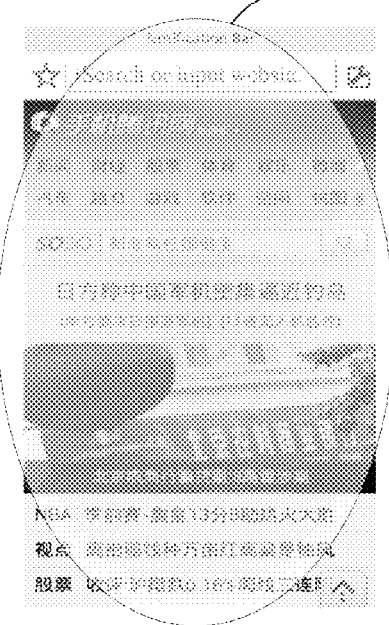
Figure 2C:
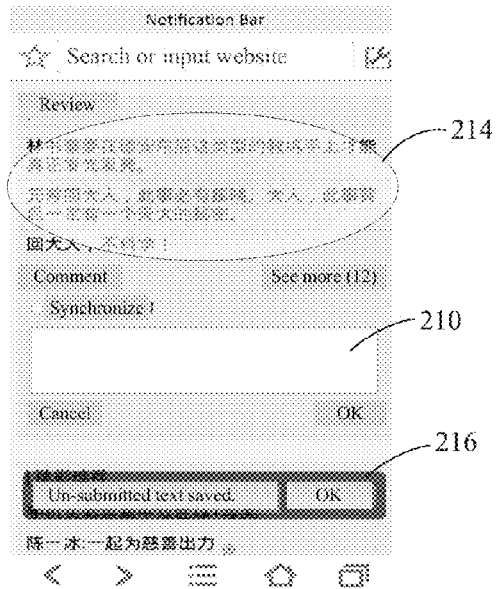

In FIG. 2b, the browser can be restarted to provide a webpage 200b. In FIG. 2c, after the browser is restarted, the browser can load a web page 200c same as the web page 200a before the browser is abnormally terminated and can popup a prompt box 216 to remind the user of the saved text content.

Figure 2D:
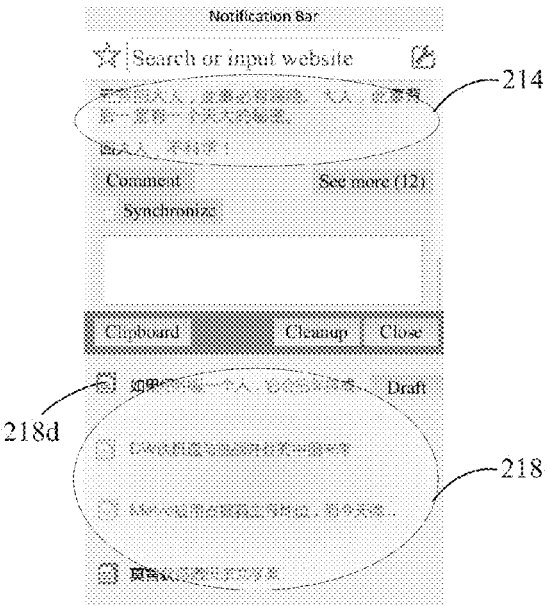

In FIG. 2d, the browser can receive a restoring instruction from the user (e.g., the user may click "OK" button in the prompt box 216 in FIG. 2c), and can display all saved text content in a listing 218. For example, text content marked with a "draft" sign is protected text content, i.e., the text content inputted right before the browser is abnormally terminated. Other exemplary text content may include text content that the user previously copied. The listing can also have a "Cleanup" button and a "Close" button. The "Cleanup" button is used to clean up all saved text content, while the "Close" button is used to close the listing. A text content selection instruction sent from the user according to the displayed listing can be received.

In FIG. 2e, the browser can import the user selected text content 218d (also shown in FIG. 2d) into the input field 210 and close the listing. In FIG. 2f, when the browser is abnormally terminated for multiple times while the user inputting the text content, the listing can save multiple text content. The multiple saved text content can include the user inputted text content (e.g., the text content marked with the "draft" sign in FIG. 2f) and the user copied text content (not shown). The multiple saved-text content can be sorted by a timestamp for saving the text content. Note that the "draft" sign can always be there to distinguish the user inputted text from the user copied text. The "draft" sign cannot disappear because of the click operation from the user.

FIG. 3 depicts an exemplary apparatus for text input protection in accordance with various disclosed embodiments. The exemplary apparatus for text input protection can be a software unit/module running in a mobile terminal, or a hardware unit/module, or a software-hardware combined unit/module, or an independent component integrated into a mobile terminal, or an independent component running in application systems of a mobile terminal.

The exemplary apparatus for text input protection includes a storage unit 31, and/or an importing unit 32. The storage unit 31 is configured to save text content inputted in the input field, after the text content inputted by a user in an input field of a browser is detected on a mobile terminal. The storage unit 31 can be configured in a terminal device or a server as depicted in FIG. 4.

In one embodiment, text input protection function can be started, after receiving an instruction to enable the text input protection function from the user, or after receiving a triggering notification to enable the text input protection function generated according to a pre-set time interval. After the text input protection function is started, the user inputted text content can be automatically saved when the mobile terminal browser detects that the user inputs the text content in the input field of the browser.

The importing unit 32 is configured, when the browser is abnormally terminated during the course of the user inputting the text content and after the browser is restarted, to import the saved text content into the text input field.

In one embodiment, the input field can include a web page input field. When the browser is abnormally terminated while the user inputting the text content, after the browser is restarted, and after a web page previously displayed by the browser is restored by the browser, the importing unit 32 is configured to import the saved text content into the text input field.

Optionally, when the browser is abnormally terminated while the user inputting the text content and the inputted text content has a length exceeding a text content length threshold, the importing unit 32 is configured to import the saved text content into the input field after the browser is restarted.

Optionally, when the browser is abnormally terminated while the user inputting the text content and the inputted text content has a length exceeding a text content length threshold, and after the browser is restarted, the importing unit 32 is configured to pop up a prompt box to notify the user about the saved text content; to receive a restoring instruction from the user; and to import the saved text content into the input field.

Optionally, when the browser is abnormally terminated while the user inputting the text content and the inputted text content has a length exceeding a text content length threshold, and after the browser is restarted, the importing unit 32 is configured to pop up a prompt box to notify the user about the saved text content; to display multiple saved text content in a listing; to receive a text content selection instruction sent from the user according to the displayed listing; to select text content from the multiple saved text content in the listing according to the text content selection instruction; and to import the selected text content into the input field.

Further, the exemplary apparatus can include a cleanup unit 33 configured to clean up the saved text content after an instruction for refusing to restore sent from the user is received, or after that the inputted text content is submitted normally is detected.

Optionally, when the browser is abnormally terminated while the user inputting the text content and the inputted text content has a length exceeding a text content length threshold, and after the browser is restarted, the cleanup unit 33 can be configured to notify the user to re-input and cleanup the saved text content.

As disclosed, the exemplary apparatus can automatically save text content when the user inputs the text content in an input field of a browser on a mobile terminal is detected. When the browser is abnormally terminated while the user inputting the text content, the browser is restarted and the saved text content is imported into the text input field.

This can solve problem that the inputted text may be lost due to abnormal termination of the browser. Repeated operations can thus be reduced and text inputting efficiency can be improved. In addition, application scenarios can be distinguished for the user. In order to avoid frequent disturbing to the user, when the browser is abnormally terminated while the user inputting the text content, a length of the inputted text content can be analyzed. When the length of the inputted text content exceeds the text content length threshold, the browser can be restarted and the saved text content can be imported into the input field.

Further, when the browser is abnormally terminated for multiple times while the user inputting the text content, all of the saved text content can be displayed in a listing, which is convenient for the user to select the text content needed to be imported into the input field. Furthermore, to save the storage space, the exemplary methods can clean up the text content saved at the backend, after an instruction for refusing to restore is received or after it is detected that the inputted text content is submitted normally.

Various embodiments also provide a computer storage medium. The computer storage medium may store a program. Execution of the program includes some or all of the steps of the exemplary methods for implementing internet applications as disclosed herein.

The units included herein are described according to their functional logic, but are not limited to the above descriptions as long as the units can implement corresponding functions. Further, the specific name of each functional unit is used for distinguishing from on another without limiting the protection scope of the present disclosure. In various embodiments, the disclosed units can be configured in one apparatus or configured in multiple apparatus as desired. The units disclosed herein can be integrated in one unit or in multiple units. Each of the units disclosed herein can be divided into one or more sub-units, which can be recombined in any manner.

Note that suitable software and/or hardware (e.g., a universal hardware platform) may be included and used in the disclosed methods and systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a " does not exclude other elements included in the process, method, article, or apparatus having those elements.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

The embodiments disclosed herein are exemplary only. The order by which the foregoing examples of the present disclosure are presented merely reflects the convenience of description. It does not imply the preference among the examples. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and apparatus for text input protection can automatically save text content when the user inputs the text content in an input field of a browser on a mobile terminal is detected. When the browser is abnormally terminated while the user inputting the text content, the browser is restarted and the saved text content is imported into the text input field.

This can solve problem that the inputted text may be lost due to abnormal termination of the browser. Repeated operations can thus be reduced and text inputting efficiency can be improved. In addition, application scenarios can be distinguished for the user. In order to avoid frequent disturbing to the user, when the browser is abnormally terminated while the user inputting the text content, a length of the inputted text content can be analyzed. When the length of the inputted text content exceeds the text content length threshold, the browser can be restarted and the saved text content can be imported into the input field.

Further, when the browser is abnormally terminated for multiple times while the user inputting the text content, all of the saved text content can be displayed in a listing, which is convenient for the user to select the text content needed to be imported into the input field. Furthermore, to save the storage space, the exemplary methods can clean up the text content saved, after an instruction for refusing to restore is received or after it is detected that the inputted text content is submitted normally.

What is claimed is:

1. A method for text input protection, comprising:
   automatically saving text content inputted in an input field, after the text content inputted by a user in the input field of a browser on a mobile terminal is detected;
   determining, by the browser, after the browser is restarted, a length of the saved text content; wherein the browser is restarted, after the browser is terminated under abnormal circumstances while the user is inputting the text content; and
   after the browser is restarted:
      importing the saved text content into the input field, when the determined length of the saved text content is greater than a text content length threshold; and
      discarding the saved text content and notifying the user to input text content in the input field, when the determined length of the saved text content is not greater than the text content length threshold.

2. The method of claim 1, wherein importing the saved text content into the input field includes:
   popping up a prompt box to notify the user about the saved text content;
   receiving a restoring instruction from the user; and
   importing the saved text content into the input field, in response to receiving the restoring instruction from the user.

3. The method of claim 1, wherein importing the saved text content into the input field includes:
   popping up a prompt box to notify the user about the saved text content;
   listing multiple saved text content in a chronological order, the listing including: the automatically saved text content when the browser abnormally terminated, and text content previously clipped by the user of the mobile terminal;
   receiving a text content selection instruction based on user selected text content from the listing;
   selecting text content from the multiple saved text content from the listing according to the text content selection instruction; and
   importing the selected text content into the input field.

4. The method of claim 1, further including:
   receiving an instruction for refusing to restore sent from the user, or detecting that the user has submitted the inputted text content; and
   discarding the saved text content after the instruction is received.

5. The method of claim 1, wherein the input field includes a web page input field and importing the saved text content into the input field includes:
   when the browser is terminated under abnormal circumstances while the user is inputting the text content, importing the saved text content into the input field after the browser is restarted and after a web page previously displayed by the browser is restored.

6. An apparatus for text input protection, comprising at least a processor and a plurality of program units to be executed by the processor, the plurality of program units comprising:
   a storage unit configured to automatically save the text content inputted in the input field, after text content inputted by a user in an input field of a browser on a mobile terminal is detected; and
   an importing unit configured to:
      determine a length of the saved text content after the browser is restarted;
   wherein the browser is restarted, after the browser is terminated under abnormal circumstances while the user is inputting the text content; and
   after the browser is restarted:
      import the saved text content into the input field when the determined length of the saved text content is greater than a text content length threshold; and
      discard the saved text content and notifying the user to input text content in the input field, when the determined length of the saved text content is not greater than a text content length threshold.

7. The apparatus of claim 6, wherein, when the browser is terminated under abnormal circumstances while the user inputting the text content, and when the inputted text content has a length exceeding the text content length threshold, and after the browser is restarted, the importing unit is further configured to:
   pop up a prompt box to notify the user about the saved text content;
   receive a restoring instruction from the user; and
   import the saved text content into the input field.

8. The apparatus of claim 6, wherein, when the browser is terminated under abnormal circumstances while the user inputting the text content, and when the inputted text content has a length exceeding the text content length threshold, and after the browser is restarted, the importing unit is further configured to:
   pop up a prompt box to notify the user about the saved text content;
   display multiple saved text content in a listing in a chronological order, the listing including: the automatically saved text content when the browser abnormally terminated, and text content previously clipped by the user of the mobile terminal;
   receive a text content selection instruction based on user selected text content from the displayed listing;

select text content from the multiple saved text content in the listing according to the text content selection instruction; and import the selected text content into the input field.

9. The apparatus of claim 6, wherein the plurality of program units further includes a cleanup unit configured to:

receive an instruction for refusing to restore sent from the user, or to detect that the user has submitted the inputted text content; and to discard the saved text content after the instruction is received.

10. The apparatus of claim 7, wherein the input field includes a web page input field and, when the browser is terminated under abnormal circumstances while the user is inputting the text content, the importing unit is configured to:

import the saved text content into the input field, after the browser is restarted, and after a web page previously displayed by the browser is restored.

11. A non-transitory computer-readable medium having computer program for, when being executed by a processor, performing a method for text input protection, the method comprising:

automatically saving text content inputted in an input field, after the text content inputted by a user in the input field of a browser on a mobile terminal is detected;

determining, by the browser, after the browser is restarted, a length of the saved text content; wherein the browser is restarted after the browser is terminated under abnormal circumstances while the user is inputting the text content; and after the browser is restarted:

importing the saved text content into the input field, when the determined length of the saved text content is greater than a text content length threshold; and discarding the saved text content and notifying the user to input text content in the input field, when the determined length of the saved text content is not greater than the text content length threshold.

12. The non-transitory computer-readable medium of claim 11, wherein importing the saved text content into the input field includes:

popping up a prompt box to notify the user about the saved text content;

receiving a restoring instruction from the user; and importing the saved text content into the input field, in response to receiving the restoring instruction from the user.

13. The non-transitory computer-readable medium of claim 11, wherein importing the saved text content into the input field includes:

popping up a prompt box to notify the user about the saved text content;

listing multiple saved text content in a chronological order, the listing including: the automatically saved text content when the browser abnormally terminated, and text content previously clipped by the user of the mobile terminal;

receiving a text content selection instruction based on user selected text content from the listing;

selecting text content from the multiple saved text content from the listing according to the text content selection instruction; and importing the selected text content into the input field.

14. The non-transitory computer-readable medium of claim 11, the method further including:

receiving an instruction for refusing to restore sent from the user, or detecting that the user has submitted the inputted text content; and discarding the saved text content.

15. The non-transitory computer-readable medium of claim 11, wherein the input field includes a web page input field and importing the saved text content into the input field includes:

when the browser is terminated under abnormal circumstances while the user is inputting the text content, importing the saved text content into the input field, after the browser is restarted, and after a web page previously displayed by the browser is restored.

16. The method of claim 1, wherein:

the text content inputted in the input field is automatically saved into a text listing; and the text listing is configured to save: automatically saved text content, and text content clipped by a user of the mobile terminal.

17. The method of claim 16, wherein:

when the text listing is displayed, the automatically saved text content is marked by a draft sign for differentiating between the automatically saved text content and the text content clipped by the user.

18. The method of claim 16, wherein:

when the text listing includes multiple text contents and the text listing is displayed, the multiple text contents are sorted by timestamps for saving the multiple text contents.

* * * * *